S. S. KNIGHT.
CAR TRUCK.
APPLICATION FILED FEB. 23, 1911.

997,395.

Patented July 11, 1911.

2 SHEETS—SHEET 1.

WITNESSES

INVENTOR
SHERWOOD S. KNIGHT
BY
ATT'Y.

S. S. KNIGHT.
CAR TRUCK.
APPLICATION FILED FEB. 23, 1911.
997,395.
Patented July 11, 1911.
2 SHEETS—SHEET 2.
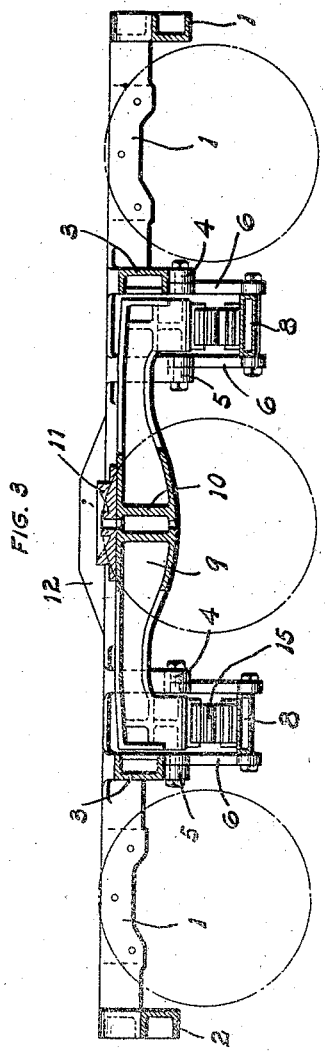
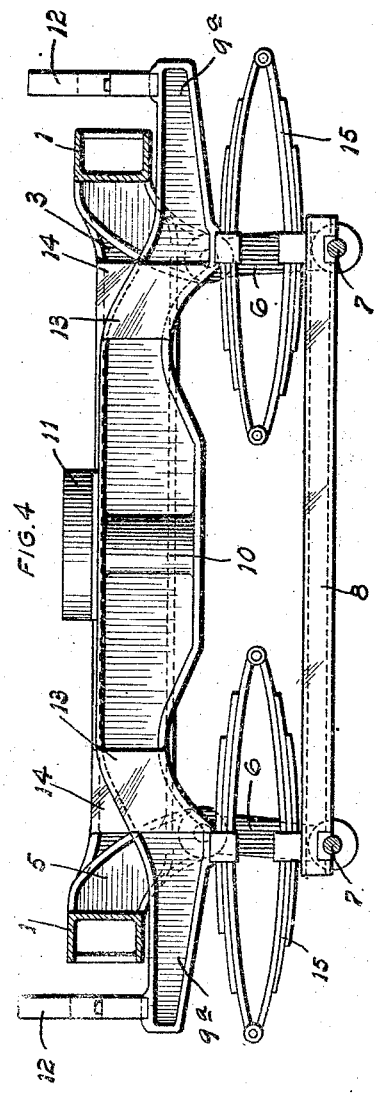
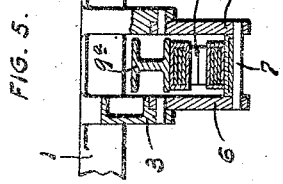
WITNESSES
INVENTOR
SHERWOOD S. KNIGHT

UNITED STATES PATENT OFFICE.

SHERWOOD S. KNIGHT, OF ST. LOUIS, MISSOURI, ASSIGNOR TO SCULLIN-GALLAGHER IRON & STEEL COMPANY, OF ST. LOUIS, MISSOURI, A CORPORATION OF MISSOURI.

CAR-TRUCK.

997,395.  Specification of Letters Patent.  Patented July 11, 1911.

Application filed February 23, 1911. Serial No. 610,350.

*To all whom it may concern:*

Be it known that I, SHERWOOD S. KNIGHT, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1:
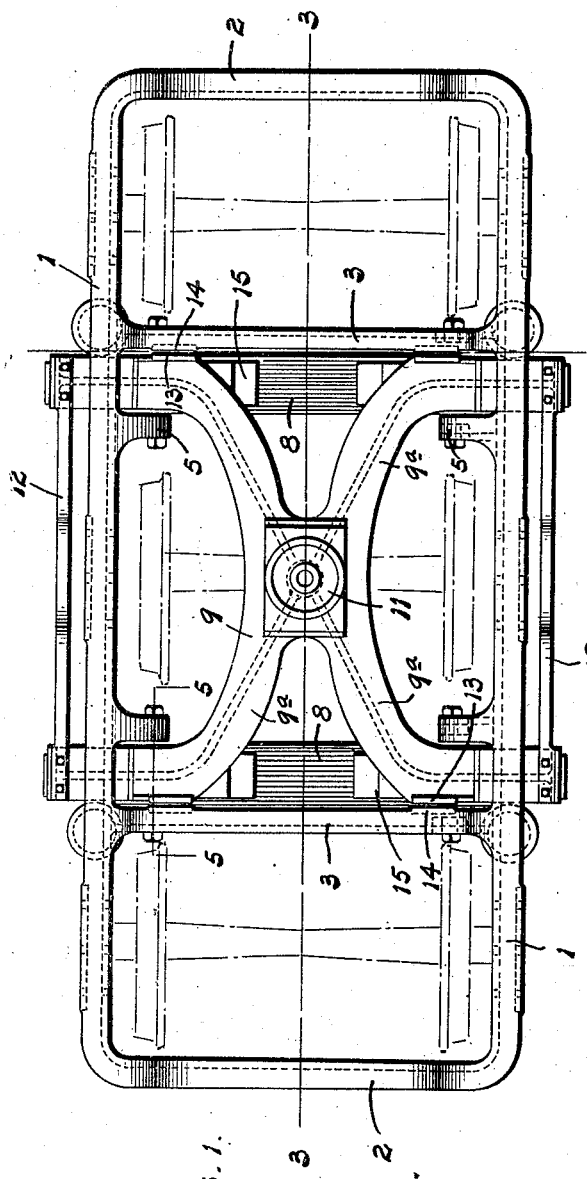
Figure 2:
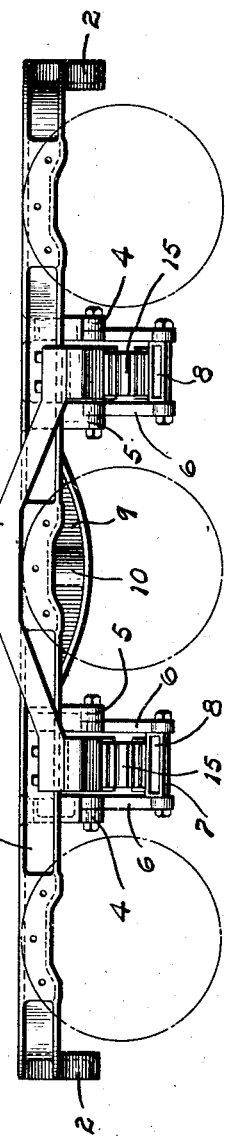

Figure 1 is a top plan view of a six-wheel car truck of my improved construction. Fig. 2 is a side elevation of the truck. Fig. 3 is a vertical longitudinal section through the center of the truck and taken approximately on the line 3—3 of Fig. 1. Fig. 4 is an enlarged transverse section taken on the line 4—4 of Fig. 1. Fig. 5 is a vertical section taken approximately on the line 5—5 of Fig. 1.

My invention relates generally to car trucks of the six-wheeled type such as are now in general use on passenger cars, and the principal objects of my invention are to provide a car truck of comparatively simple construction combining minimum weight with maximum strength and rigidity, and to provide a single X or H-shaped casting in which the bolster and upper spring-beams are combined, the ends of which casting extend beneath the side rails of the truck frame, and there bear upon the elliptic springs carried by the spring planks, and which latter are swingingly supported from the truck frame.

Further objects of my invention are to mount arch bars on the outer ends of the X or H-shaped casting, the central portions of which arch bars receive the side bearings, to form chafing plates on the specially formed casting, and the transoms of the truck frame, and to arrange on the center of the specially formed casting, a detachable center bearing plate.

To the above purposes my invention consists in certain novel features of construction and arrangement of parts hereinafter more fully described and claimed.

In my improved construction the truck frame comprises a pair of side members 1, end rails 2 and transoms 3 all of which parts are preferably cast integral and of channel-shape in cross section, although it will be readily understood that the various parts of the frame so constructed can be box-shaped, or of I-beam shape in cross section.

Formed integral with or rigidly fixed to the transoms 3 adjacent the side members 1 are depending lugs 4 and formed integral with the side members 1, inside the transoms 3 are inwardly and downwardly projecting brackets 5, the lower ends of which are in horizontal alinement with the lugs 4. Pivotally mounted in any suitable manner upon the lugs 4 and 5 are links or hanger bars 6, and supported upon rods 7 passing through the lower ends of the corresponding pairs of links 6 are the ends of spring planks 8.

9 designates the H or X-shaped casting, which performs the function of the truck bolster, and the spring beams, said casting being composed of four arms $9^a$ of I-beam shape in cross section, the inner ends of which arms are united to form a centrally arranged body 10. Bolted or riveted on top of this centrally arranged body is a center bearing plate 11 perforated and adapted to receive the king pin. The outer portions of the arms $9^a$ are curved downward and occupy positions between the transoms and the brackets 5 and the ends of said arms extend beneath the side members 1 of the truck frame. Bolted to said ends outside the side members 1 are the ends of arch bars 12, the central portions of which are adapted to receive the side bearings.

Formed integral with the outer faces of the end portions of the arms $9^a$ are chafing plates 13, which are adapted to frictionally engage against the faces of corresponding chafing plates 14, formed integral with the inner faces of the transom 3.

15 designates elliptic springs resting upon the ends of the spring planks 8, and the under sides of the end portions of the arms $9^a$ bear on the central portions of the tops of these springs. Thus the X-shaped casting is yieldingly supported upon the spring planks 8 and the latter are mounted to swing relative to the truck frame by means of the hanger links 6.

The construction herein shown and described provides a very simple, strong and durable truck, the parts of which can be readily assembled or taken apart, and by combining the truck bolster and the spring beams in a single casting, a very strong and rigid construction is provided, wherein a minimum amount of material is used, thereby effecting a considerable saving in manufacture.

It will be readily understood that minor changes in the size and form of the various parts of my improved truck can be readily made and substituted for those herein shown and described without departing from the spirit of my invention, the scope of which is set forth in the appended claims.

I claim:

1. In a car truck of the class described, the combination with the truck frame, of an X-shaped truck bolster yieldingly supported in said frame, the ends of the arms of which X-shaped bolster extend beneath the side members of the truck and arch bars connecting the ends of said arms outside the side members of the truck frame.

2. In a car truck the combination with the truck frame and spring planks of an X-shaped casting, the ends of the arms of which extend beneath the side members of the truck frame over the ends of the spring planks, springs interposed between the ends of the arms of said casting and the spring planks, and arch bars connecting the ends of said arms outside the side members of the truck frame.

3. In a car truck of the class described, a truck frame, spring planks mounted to swing thereon, a casting comprising four arms united at the center of the truck frame, the ends of which arms are yieldingly supported upon the ends of the spring planks and arch bars connecting the ends of the arms outside the side members of the truck frame.

4. In a car truck of the class described, a truck frame, spring planks mounted to swing thereon, a casting comprising four arms united at the center of the truck frame, the ends of which arms are yieldingly supported upon the ends of the spring planks, which arms are of I-beam shape in cross section and arch bars connecting the ends of said arms outside the side members of the truck frame.

5. In a car truck of the class described, a truck frame, spring planks mounted to swing thereon, an X-shaped casting, the ends of the arms of which extend beneath the side members of the truck frame and are yieldingly supported upon the spring planks, arch bars connecting the ends of the arms of the X-shaped casting outside the truck frame, and a center bearing plate fixed to the center of the X-shaped casting.

6. In a car truck, a truck frame, transoms forming a part of said frame, brackets on the side members of the frames adjacent the transoms, spring planks mounted to swing from the transoms and the brackets, an X-shaped casting, the ends of the arms of which extend between the transoms and the brackets, and springs interposed between the ends of said arms and the spring planks.

7. In a car truck, a truck frame, transoms forming a part of said frame, brackets on the side members of the frames adjacent the transoms, spring planks mounted to swing from the transoms and the brackets, an X-shaped casting, the ends of the arms of which extend between the transoms and the brackets, springs interposed between the ends of said arms and the spring planks, and arch bars connecting the ends of said arms outside the side members of the truck frame.

8. In a car truck of the class described, a combined bolster and spring beam member comprising an X-shaped casting yieldingly mounted within the truck frame, and a center bearing plate on said X-shaped casting.

9. In a car truck, a truck frame, transoms forming a part of said frame, brackets on the side members of the frames adjacent the transoms, spring planks mounted to swing from the transoms and the brackets, an X-shaped casting, the ends of the arms of which extend between the transoms and the brackets, springs interposed between the ends of said arms and the spring planks, arch bars connecting the ends of said arms outside the side members of the truck frame, and the arms of which X-shaped casting are of I-beam shape in cross section.

In testimony whereof I hereunto affix my signature in the presence of two witnesses, this 18th day of February, 1911.

SHERWOOD S. KNIGHT.

Witnesses:
M. P. SMITH,
B. S. REID.